United States Patent

Torralba

(10) Patent No.: US 10,268,209 B2
(45) Date of Patent: Apr. 23, 2019

(54) METHOD AND A DEVICE FOR PILOTING AN AIRCRAFT

(71) Applicant: AIRBUS HELICOPTERS, Marignane (FR)

(72) Inventor: Jose Torralba, Cugnaux (FR)

(73) Assignee: AIRBUS HELICOPTERS, Marignane (FR)

(*) Notice: Subject to any disclaimer, the term of this patent is extended or adjusted under 35 U.S.C. 154(b) by 213 days.

(21) Appl. No.: 15/370,111

(22) Filed: Dec. 6, 2016

(65) Prior Publication Data

US 2017/0160749 A1 Jun. 8, 2017

(30) Foreign Application Priority Data

Dec. 8, 2015 (FR) ...................................... 1502552

(51) Int. Cl.
| | |
|---|---|
| G05D 1/08 | (2006.01) |
| B64C 13/18 | (2006.01) |
| G05D 1/10 | (2006.01) |
| B64D 31/06 | (2006.01) |
| G01S 19/13 | (2010.01) |

(52) U.S. Cl.
CPC ........... *G05D 1/0808* (2013.01); *B64C 13/18* (2013.01); *B64D 31/06* (2013.01); *G05D 1/0858* (2013.01); *G05D 1/101* (2013.01); *G01S 19/13* (2013.01)

(58) Field of Classification Search
None
See application file for complete search history.

(56) References Cited

U.S. PATENT DOCUMENTS

| | | | |
|---|---|---|---|
| 6,622,065 B2 | 9/2003 | Mezan | |
| 8,682,507 B2 | 3/2014 | Ezerzere et al. | |
| 2007/0156338 A1* | 7/2007 | Coatantiec | G01C 21/16 |
| | | | 701/472 |
| 2009/0326816 A1* | 12/2009 | Park | G01C 21/165 |
| | | | 701/501 |
| 2013/0261853 A1 | 10/2013 | Shue et al. | |
| 2014/0027565 A1 | 1/2014 | Marvin et al. | |
| 2014/0316615 A1 | 10/2014 | Shue et al. | |

FOREIGN PATENT DOCUMENTS

| | | |
|---|---|---|
| FR | 2814433 | 3/2002 |
| FR | 2978858 | 2/2013 |
| FR | 3030058 | 6/2016 |

OTHER PUBLICATIONS

French Search Report for French Application No. FR 1502552, Completed by the French Patent Office, dated Sep. 30, 2016, 7 Pages.

* cited by examiner

*Primary Examiner* — Todd M Melton
*Assistant Examiner* — Jason R Roberson
(74) *Attorney, Agent, or Firm* — Brooks Kushman P.C.

(57) ABSTRACT

A method of assisting the piloting of an aircraft having at least one actuator acting on a control member. The aircraft has a main measurement system and a secondary measurement system respectively determining at least one predicted value and at least one measured value of a parameter that is used in at least one flight-control law. A filter unit is used to estimate an estimated value of at least one parameter with the help of the predicted and measured values, and for estimating at least one measurement accuracy margin. Each measurement accuracy margin is compared with a corresponding threshold, and the flight-control law that is to be applied is selected as a function of the comparison.

22 Claims, 3 Drawing Sheets

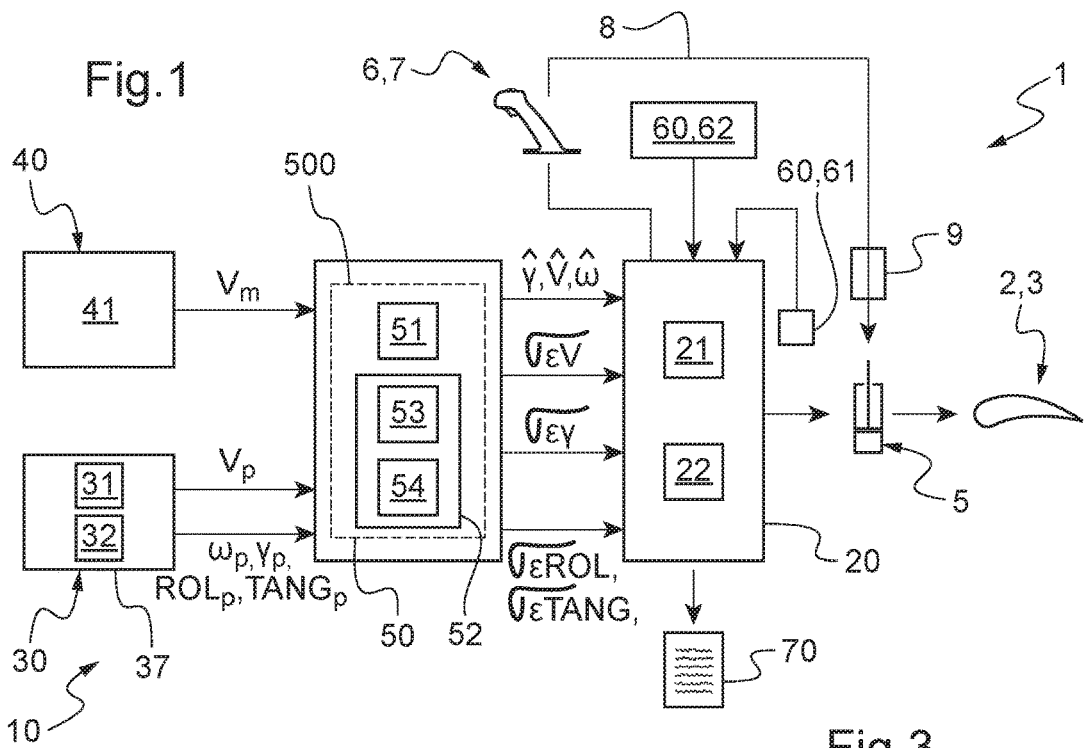
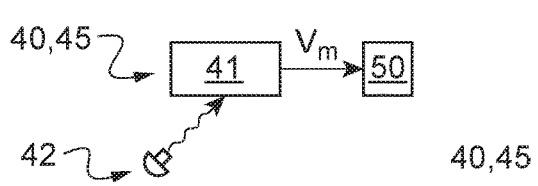
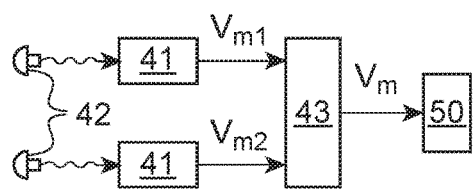
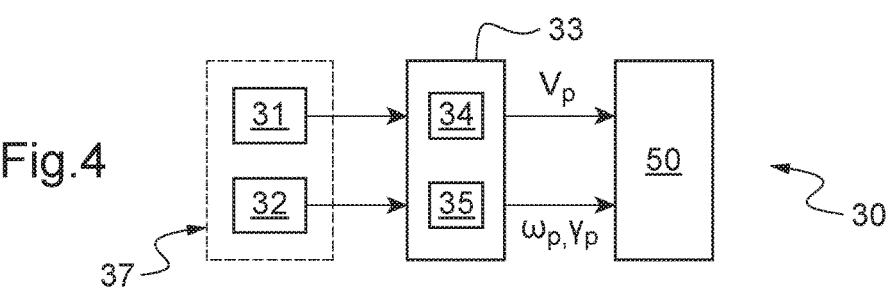
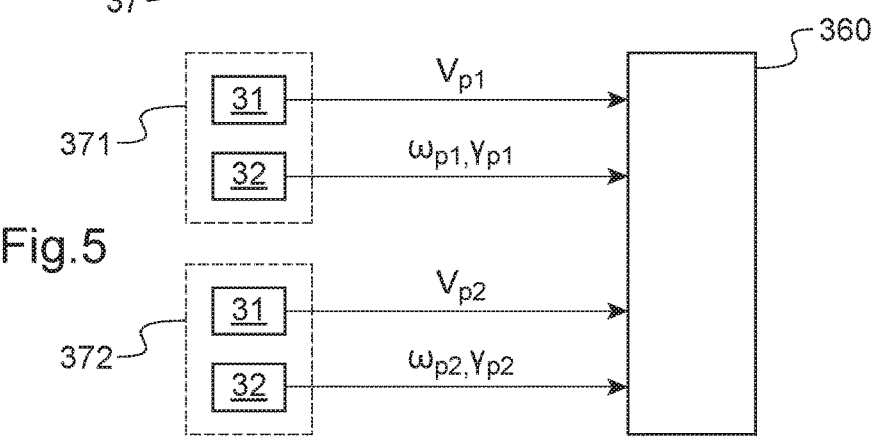

METHOD AND A DEVICE FOR PILOTING AN AIRCRAFT

CROSS REFERENCE TO RELATED APPLICATION

This application claims priority to French patent application No. FR 15 02552 filed on Dec. 8, 2015, the disclosure of which is incorporated in its entirety by reference herein.

BACKGROUND OF THE INVENTION (1) Field of the Invention

The present invention relates to a method and a device for piloting an aircraft.

The invention thus lies in the technical field of aircraft having a piloting assistance system. In particular, the invention lies in the technical field of a piloting assistance system that makes use of sensors delivering information about the movement of the aircraft, such as an angular velocity, an attitude, an acceleration, a ground speed, . . . , this information being delivered with given accuracy.

(2) Description of Related Art

The movement of an aircraft is usually controlled by moving control members of the aircraft. Each control member serves to contribute to controlling the three-dimensional position of the aircraft. In order to move the control members, the aircraft may possess actuators.

By way of illustration, the blades of a main rotor and the blades of a tail rotor of a helicopter constitute such control members. Servo-control type actuators then enable the pitch of the blades to be controlled. Furthermore, fuel metering type actuators serve to act on control members in the form of engines that drive the blades in rotation.

A piloting assistance system of an aircraft may comprise various piloting modes that make use of respective flight-control laws for controlling the actuators of the aircraft. A flight-control law serves to issue an order to at least one actuator as a function of the current values of various parameters and as a function of at least one target to be maintained. Amongst these parameters, a flight-control law may make use of at least one component of the ground speed of the aircraft in a terrestrial reference frame.

Numerous flight-control laws are known. For example, a flight-control law using a target seeks to maintain a particular target. Document FR 2 814 433 refers to such laws.

By way of illustration, a ground speed flight-control law for a rotary wing aircraft seeks to maintain a target ground speed that is given by means of a control moved by a pilot. When the pilot positions the control means in a central position, the pilot may for example be requesting a ground speed that is zero. The ground speed flight-control law then enables the aircraft to remain stationary, performing hovering flight.

In order to maintain a target as a function of ground speed, a piloting assistance system may make use of various speed measuring systems in order to evaluate at least one component of the current ground speed in a terrestrial reference frame.

A first speed measuring system is in the form of an inertial guidance platform. An inertial guidance platform is an instrument used on an aircraft in order to estimate its attitude, its speed, or indeed its position relative to a starting point.

An inertial platform is usually provided with an inertial measurement unit (IMU). The inertial measurement unit has numerous inertial sensors. An inertial measurement unit may in particular comprise three gyros used for measuring the components of an angular velocity vector about three axes. Furthermore, an inertial measurement unit may have three accelerometers for measuring the components of a specific force vector (a magnitude also known as g-force and equivalent to the load factor) along three axes of the aircraft relative to the terrestrial reference frame.

In addition, the inertial platform includes a computer connected to the inertial measurement unit. Where appropriate, the computer integrates in real time the measurements taken by the inertial measurement unit in order to determine the components of the ground speed vector of the aircraft, or indeed a pitching angle, a roll angle, and a heading angle of the aircraft, together with its position. More precisely, by integrating measurements from the gyros, the computer determines the attitude of the aircraft and thus its orientation at a given moment. Furthermore, by integrating accelerometer measurements, which may be given relative to a terrestrial reference frame external to the aircraft when the orientation of the aircraft is known, the computer determines the ground speed components of the aircraft, e.g. in the terrestrial reference frame. Finally, by integrating its speed, the computer determines the geographical position of the aircraft.

Specifically, the inertial sensors of the inertial measurement unit present measurement biases, which may indeed vary during a flight. Furthermore, such inertial sensors are subject to measurement noise. The electrical signals issued by the inertial sensors are also processed by electronic circuits, which may themselves introduce noise.

The measurement biases and noise then falsify the measurements taken. Inertial platforms are advantageous since such inertial platforms have very good availability, however, the errors to which they are thus subjected lead over time to drift in the measurements taken, and in particular in the integrated ground speed.

In order to optimize the operation of an inertial platform, the inertial platform may be provided with high-performance sensors, such as gyros that possess errors not exceeding a few hundredths of a degree per hour and accelerometers presenting errors not exceeding a few tens of millionths of terrestrial gravity. Such a high quality inertial platform is nevertheless very expensive.

A second system is in the form of a satellite positioning system.

Such a satellite navigation system comprises a receiver on board the vehicle that receives signals from a plurality of satellites belonging to a satellite constellation, the constellation being controlled by fixed infrastructure on the ground referred to as the "ground segment". The combination constituted by the receiver, the constellation, and the ground segment constitutes a satellite navigation system, which can be referred to as a global navigation satellite system (GNSS). Several global navigation satellite systems are in operation at present, such as the system known as the global positioning system (GPS), and the Russian GLONASS system. The Chinese BEIDOU system, the Japanese QZSS system, and the European GALILEO system are at present under development or deployment.

A satellite navigation system makes it possible in particular to determine the position of an aircraft and the ground speed components of that aircraft in the terrestrial reference frame.

A general limitation on using satellite navigation systems in aircraft piloting systems lies in the possibility of multiple failures affecting a plurality of satellites simultaneously, or even a compete constellation.

Document FR 3 030 058, filed on Dec. 11, 2014 with the French patent office under the reference 14/02824 proposes specifically making use of a plurality of different satellite constellations.

Furthermore, a satellite navigation system is sensitive to external disturbances, such as atmospheric disturbances, for example.

Consequently, a first system consists in coupling an inertial platform with a satellite navigation system in order to obtain estimated components of a ground speed tending to limit measurement inaccuracies. The coupling may be achieved by using a Kalman filter. A Kalman filter makes it possible to obtain estimated components for a ground speed on the basis of ground speed components obtained with the satellite navigation system and on the basis of ground speed components obtained with the inertial platform.

The ground speed components obtained with the satellite navigation system are said to be "measured" insofar as the satellite navigation system does not present measurement errors that fluctuate over time.

Conversely, because of these errors, the speed components obtained from the inertial unit are said to be "predicted".

Since the availability and the accuracy of data from satellite navigation systems and from inertial platforms are not perfect, controlling the aircraft with a flight-control law that makes use of such data can be difficult to achieve.

Furthermore, ever-higher levels of assistance in aircraft can lead to a certain loss of attention on the part of the pilot when an autopilot mode is engaged.

As a result, the operation of the autopilot system is monitored by a monitoring system.

The system for monitoring an autopilot system flying an aircraft performs the function of making safe the data sent to the autopilot module that actually generates the flight-control laws that are applied to controlling the actuators. It also has the function of issuing the information that needs to be brought to the attention of the crew, e.g. concerning a potentially degraded situation affecting the sensors in use. The consequence of sensor degradation on the pilot's workload is made transparent to the pilot for most of the time because of the redundancy among the sensors used and because of the management performed by the monitoring system, e.g. via false detection isolation and recovery (FDIR) algorithms. In contrast, after multiple failures, i.e. failures affecting a plurality of redundant sensors, the consequence on the pilot's workload can become quite significant.

In particular, it may happen that the value of a parameter used by a flight-control law becomes unavailable.

When a parameter used by the autopilot is declared to be unavailable by the monitoring system, the autopilot system is automatically disengaged so as to allow manual piloting to take over at the end of a time-out period. The transition between autopilot mode and manual piloting mode is accompanied by a major and relatively sudden change in the pilot's workload.

For example, during hovering flight undertaken by engaging an autopilot mode and making use of a flight-control law that maintains a target ground speed, a pilot may be concentrating attention on other aspects, such as a winching operation, for example. A malfunction of the system that measures the ground speed of the aircraft can lead to an unexpected movement of the aircraft that needs to be countered by the pilot, and, depending on the failure, might even lead to a sudden disengagement of the autopilot mode. The pilot then needs to take over control of the aircraft in part or in full.

The effect of degradations affecting sensors used by an automatic flight control system can therefore lead to the pilot changing piloting strategy, potentially shifting in a few seconds from an autopilot mode with a high level of assistance to a manual piloting mode.

Documents US 2014/027565, US 2014/316615, FR 2 978 858, and US 2013/261853 are also known.

BRIEF SUMMARY OF THE INVENTION

An object of the present invention is thus to propose a method that makes it possible to avoid such a sudden change under certain conditions.

The invention thus provides a piloting assistance method for an aircraft having at least one actuator acting on a control member that is used in controlling the three-dimensional position of the aircraft, the aircraft storing at least two flight-control laws, each of the flight-control law can be applied to generate an order that is transmitted to at least one actuator, the aircraft having a main measurement system and a secondary measurement system respectively determining at least one "predicted" value and at least one "measured" value for a parameter used in one of the flight-control laws referred to as the "default" flight-control law, each flight-control law other than the default flight-control law being said to be a "degraded" flight-control law.

The method comprises the following steps:

using a filter unit applying a Kalman algorithm to calculate an estimated value from at least one predicted value and at least one measured value, and for estimating at least one measurement accuracy margin;

comparing the value of a measurement accuracy margin with a corresponding threshold;

controlling said actuator while automatically applying said default flight-control law so long as each measurement accuracy margin is less than the corresponding threshold; and controlling said actuator while automatically applying a degraded flight-control law when at least one measurement accuracy margin is greater than or equal to the corresponding threshold.

The term "parameter" specifies a state parameter of the aircraft selected from a list comprising in particular the ground speed components of the aircraft in a given reference frame, e.g. in the three-dimensional terrestrial reference frame, the acceleration components of the aircraft in the same given reference frame, the components of the angular velocity of the aircraft in the given reference frame, a pitching angle of the aircraft, and a roll angle of the aircraft.

In particular, the main measurement system and the secondary measurement system may determine at least the predicted values and the measured values for the same parameters, and in particular for the ground speed components.

The filter unit then estimates "estimated values" for the parameters quantified by the main measurement system, while making use of all of the predicted and measured values.

The term "corresponding threshold" refers to the threshold corresponding to a particular measurement accuracy margin. Each measurement accuracy margin needs to be compared with a particular threshold that is referred to as the "corresponding threshold". A plurality of distinct measurement accuracy margins may be compared with the same threshold.

The main measurement system serves to determine predicted parameter values at each instant. Nevertheless, the predicted values may be contaminated by errors.

For example, said main measurement system includes a plurality of gyros and a plurality of accelerometers. The main measurement system may thus have at least one inertial measurement unit that might present measurement errors that lead to the errors concerning certain parameters, such as ground speed, increasing as a function of elapsed time.

Conversely, the secondary measurement system serves to determine measured values of these parameters. Nevertheless, these measured values may be unavailable at certain instants.

For example, the secondary measurement system may be satellite positioning means.

Alternatively, said secondary measurement system may include object detector means that emit a detection signal capable of returning to the object detector means following an impact against an object.

By way of example, another variant of the invention thus consists in using a system known under the acronym LIDAR (corresponding to light detection and ranging), and an imager, or equipment known under the acronym RADAR.

Such equipment is effective, but can be found to be temporarily inoperative.

Under such circumstances, the filter unit applies a conventional Kalman algorithm, thus making it possible to identify continuously the errors in the main measurement system by means of a model, conventionally referred to as the "error" model. Such a Kalman algorithm is usually referred to as a "Kalman filter".

The filter unit thus makes it possible to determine estimated components for piloting parameters of the aircraft, such as for example the ground speed components of the aircraft in a given reference frame, e.g. the three-dimensional terrestrial reference frame, the acceleration components of the aircraft in the given reference frame, the angular velocity components of the aircraft in the given reference frame, a pitching angle of the aircraft, and a roll angle of the aircraft.

Specifically, the filter unit may act at each calculation instant to quantify the errors of the main measurement system. Each data value estimated by the filter unit is then obtained by subtracting an error as estimated for the main measurement system from a data value coming from that main measurement system.

By way of illustration, the main measurement system estimates in particular the predicted values of the ground speed components in the terrestrial reference frame. The secondary measurement system supplies the filter unit with the measured values of the ground speed components in the terrestrial reference frame. The filter unit then determines a ground speed error for each ground speed component as a function of the predicted and measured values. Each estimated value of a ground speed component is then equal to the difference of the predicted value for the ground speed component minus the speed error for that component.

Furthermore, the filter unit makes it possible to determine the accuracy of the data being used. Specifically, the filter unit draws up a covariance matrix, with each measurement accuracy margin then being equal to the square root of a corresponding term present on the diagonal of the covariance matrix. For example, the covariance matrix may have terms on its diagonal that relate to respective ones of the above-mentioned parameters.

Each measurement accuracy margin represents the accuracy margin of a parameter. For example, the filter unit estimates a value for the horizontal component of the ground speed of the aircraft to be 100 knots (kt), and the accuracy margin of this value is estimated as being 0.5 kt. The horizontal component is thus equal to 100 kt plus or minus 0.5 kt.

It should be recalled that one knot corresponds to one nautical mile per hour, which is equivalent to 1.852 kilometers per hour or 0.514 meters per second.

Reference may be made to the literature in order to obtain information about filter units that make use of Kalman algorithms. For example, the Wikipedia Internet site publishes various Kalman filter equations. For more details, reference may also be made to the document published by Institut Supérieur de L'Aéronautique et de l'Espace (ISAE) [the Aerospace Engineering School in Toulouse, France] by following the link: https://www.google.fr/url?sa=t&rct=j&q=&esrc=s&source=web&cd=1&ved=0ahUKEwj0rJmQ36PJAhXIwBQKHZcKDT8QFggg MAA&url=http%3A%2F%2Fpersonnel.isae.fr%2F sites%2Fpersonnel%2FIMG%2Fpdf%2FintoKalman vf 2008.pdf&usg=AFQjCNFQbCt6m4lt4-lnksC053sPfCavIg&sig2=00nxCjUu0zIyiB-mbIF8vg&bvm=bv.108194040,d.ZWU&cad=rja.

So long as the secondary measurement system is operational, each measurement accuracy margin is less than a predetermined threshold.

Under such circumstances, the autopilot system controls the aircraft by applying the default flight-control law, i.e. the flight-control law that provides the best piloting assistance.

In contrast, when the secondary measurement system is temporarily inoperative, the errors in the main measurement system increase. The aircraft is then piloted by automatically applying a degraded flight-control law.

Consequently, the method proposes not disconnecting the autopilot system, but rather applying a degraded flight-control law that is better adapted to the situation.

In order to maintain an appropriate workload for the pilot during stages in which the secondary measurement system is not operating, the method enables transitions to take place automatically towards degraded flight-control laws as a function of the states of the measurement systems. Such an automatic transition therefore does not require the pilot to reconfigure the piloting system manually. The workload of the pilot is thus limited in situations that are potentially stressful for the pilot.

The term "degraded flight-control law" refers to a law that increases the workload on the pilot, but that benefits from being more robust in the face of certain sensor errors.

Under such circumstances, various different degraded flight-control laws may be used, each degraded flight-control law being associated with utilization configurations that depend on measurement accuracy margins.

These degraded flight-control laws are adapted to the types of error that are encountered by the main measurement system, and to the amplitudes of these errors as a function of amplitudes that are typically acceptable for piloting. The greater the error of the main measurement system, the greater the measurement accuracy margins. As a function of the errors encountered, the invention thus proposes various different flight-control laws.

The method thus acts automatically to provide the pilot with the flight-control law that is the best adapted as a function of the estimated state of the main measurement system, which state is estimated by using the measurement accuracy margins.

The term "best adapted" refers to the flight-control law giving the best compromise between the workload on the pilot for controlling the aircraft and the robustness of the flight-control law in the face of measurement errors.

Automating the switching over between various types of flight-control law in this way is not obvious. Specifically, defining thresholds that enable switching to take place between various laws is not obvious since those thresholds need to take into consideration the workload that is judged to be acceptable for the pilot, and they must make it possible to minimize the increase in the workload on the pilot as a result of changing the flight-control law.

Furthermore, the estimated measurement accuracy margins are representative of the greater or lesser variation in the accuracy of the parameter(s) of interest as a function of the more or less dynamic flightpath of the aircraft. A flightpath that is dynamic leads to large variations in the measurement accuracy margins.

This rich information is transmitted in real time by means of the information supplied by the main measurement system (e.g. load factors), so as to optimize the availability of the default flight-control law when information from the secondary measurement system is lost.

For example, after the secondary measurement system has been lost, for a flight that is not very dynamic the measurement accuracy margins might vary slowly. The default flight-control law can then possibly continue to be used throughout the remainder of the flight, even if the secondary measurement information does not return.

In contrast, if the flightpath is more dynamic, the measurement accuracy margins might vary quickly, leading to the system being informed that the errors are growing more quickly (compared with the situation that is not very dynamic). The default flight-control law then needs to be deactivated quite soon, but possibly later than would be necessary if a conventional system were being used to deactivate it after a time delay measured from the instant at which the secondary measurement is lost.

The method may also include one or more of the following characteristics.

Thus, the method may include a warning step during which a warning is generated when a degraded flight-control law is applied.

A visual and/or audible and/or haptic warning is generated so that the pilot is made aware of the flight-control law being applied. For example, a screen may display a message stating which flight-control law is being applied.

Optionally, said default flight-control law is a main ground speed flight-control law that generates a given order to at least one actuator so as to maintain a target ground speed.

For example, the pilot of the helicopter moves a cyclic pitch control stick in order to generate a ground speed target. The autopilot system then applies the main ground speed flight-control law so as to reach the given ground speed target.

In particular, the main ground speed flight-control law acts during each turn to impose a lateral speed that is to be achieved by the aircraft relative to the ground in a lateral direction present in a horizontal plane perpendicular to gravity, the lateral direction being perpendicular to the heading being followed.

The term "lateral speed that is to be achieved" designates a sideslip speed that is to be reached during the maneuver.

This lateral speed that is to be achieved while turning may naturally be modified if the pilot so wishes. In particular, the lateral speed that is to be achieved may be a zero speed in the absence of any specific order being issued by the pilot concerning this parameter, or it may be a particular lateral speed selected by the pilot.

The main ground speed flight-control law gives the pilot a high level of assistance. In particular, the main ground speed flight-control law enables the pilot to be assisted in coordinating turns, i.e. in maintaining a particular lateral speed while turning. Decoupling terms are then provided in the main ground speed flight-control law. These terms depend on the yaw angular velocity of the aircraft and on the ground speed components of the aircraft.

Such a main ground speed flight-control law is known to the person skilled in the art.

In addition, a degraded flight-control law may be a secondary ground speed flight-control law that generates a given order for at least one actuator in order to maintain a ground speed target, the secondary ground speed flight-control law not proposing automatic turn coordination and thus, during turning, not controlling the lateral speed that is to be achieved by the aircraft relative to the ground in a lateral direction present in a horizontal plane perpendicular to gravity, said lateral direction being perpendicular to the heading being followed.

Under such circumstances, the method may comprise the following steps:

using a filter unit applying a Kalman algorithm to respond to each predicted value and to each measured value to calculate an estimated value for a parameter associated with a predicted value and an estimate of at least one measurement accuracy margin for a parameter associated with a predicted value; and comparing each speed accuracy margin with a "speed" threshold, said secondary ground speed flight-control law being applicable only if at least one speed accuracy margin is greater than or equal to the speed threshold.

Such a speed threshold is advantageously equal to 2 kt.

The term "being applicable only" means that the corresponding condition is a condition that is necessary, but not necessarily sufficient.

In a nominal situation, the ground speed components are supplied by the main measurement system and by the secondary measurement system. Under such conditions, a Kalman filter applied by the filter unit serves to estimate accurately the errors of the main measurement system. Such a main ground speed flight-control law making it possible to maintain a ground speed target is proposed to the pilot.

The Kalman filter produces estimates of the parameter accuracy margins that are evaluated by applying a Riccati equation using an error model for the main measurement system, including after losing information coming from the secondary measurement system. When information coming from the secondary measurement system is lost, the measurements taken by the main measurement system are no longer compensated for their errors. These errors increase progressively at a greater or lesser speed, as a function of the nature of the main measurement system and of the flightpath being followed. Nevertheless, the hybridizing performed using the Kalman filter prior to losing information coming from the secondary measurement system makes it possible to slow down the increase in the errors for a certain length of time.

Furthermore, by estimating the measurement accuracy margins of monitored parameters, the filter unit also makes it possible to determine the instant at which the flight-control laws should be switched over on the basis of predefined thresholds. The more dynamic the flightpath, the sooner the switchover, since the measurement accuracy margins themselves depend on the flightpath being followed.

Specifically, so long as the data transmitted by the secondary measurement system continues to be available, the measurement accuracy margins are less than the corresponding thresholds. The main ground speed flight-control law is then applied.

The autopilot system then controls the aircraft correctly, e.g. maintaining substantially zero lateral speed while turning.

In the event of data transmitted by the secondary measurement system being lost, the measurements of the ground speed components are contaminated by a certain amount of error.

In the absence of the invention, the autopilot system then no longer pilots the aircraft correctly since one of the parameters of the flight-control law being applied is no longer being measured correctly. For example, the aircraft no longer maintains a zero lateral speed while turning. The pilot must then intervene manually in order to maintain the desired flightpath, in particular while turning. The action of the pilot needs to be increasingly dynamic with increasing rate of turn, thereby increasing the workload on the pilot under such conditions.

According to the invention, a speed accuracy margin for at least one estimated ground speed component will then exceed a predefined speed threshold in the event of loss of data transmitted by the secondary measurement system.

Under such circumstances, a switchover to the secondary ground speed flight-control law takes place automatically. Thereafter, the turn coordination term of the main ground speed flight-control law is inhibited. The consequence of this switchover is an increase in the workload on a pilot while turning, but the pilot is nevertheless completely unaffected by unpredictable flightpath errors resulting from using a wrongly estimated speed.

Furthermore, a degraded flight-control law may be an attitude-maintaining flight-control law that generates a given order to at least one actuator in order to maintain a target attitude for the aircraft.

An attitude target may be in the form of a target given to a roll angle of the aircraft and/or to a pitching angle of the aircraft.

Thus, the method may present the following steps:

using the filter unit to calculate components of an estimated acceleration of the aircraft and at least one measurement accuracy margin, said at least one measurement accuracy margin comprising an acceleration accuracy margin for each component of the estimated acceleration of the aircraft; and comparing each acceleration accuracy margin with an "acceleration" threshold, said attitude-maintaining flight-control law being applicable only if at least one acceleration accuracy margin is greater than or equal to the acceleration threshold.

By way of example, the acceleration threshold is equal to one thousandth of terrestrial gravity.

An error relating to the ground speed component is associated with a certain drift speed, which corresponds to an error in an acceleration component of the aircraft.

According to the Applicant, this error in an acceleration component may lead to a problem in controlling the aircraft while hovering. While using a ground speed flight-control law, any variation in acceleration of the order of 0.5 thousandths of gravity leads to a significant workload on the pilot in order to compensate for the disturbing effect of this variation on the three-dimensional position of the aircraft.

Consequently, the method proposes a second automatic switchover to an attitude-maintaining flight-control law beyond a certain level of acceleration error, and thus when an acceleration accuracy margin is greater than or equal to the acceleration threshold. Specifically, an acceleration error of 1 thousandth of the acceleration due to gravity (mg) represents an equivalent attitude error of 1 milliradian (mrad), i.e. 0.057°. This attitude error leads to a practically imperceptible consequence for the attitude being maintained with an attitude flight-control law. Consequently, it makes sense to apply an attitude-maintaining flight-control law.

Furthermore, in the context of a main measurement system of the inertial measurement unit type, each gyro may belong to a class of gyro having accuracy of 0.1 degrees per hour (°/h), or better.

This embodiment makes use of robust inertial sensors of a class that is better than 10 nm/h (nautical mile per hour) using a gyro having accuracy no worse than 0.1°/h. Furthermore, the sensitivity of inertial sensors to potentially more dynamic behavior of the aircraft is advantageously as small as possible. In terms of inertial sensor specifications, this constraint means that the scale factor of the gyros and the inter-axis non-orthogonality of the sensors need to be small.

Consequently, another switchover, e.g. depending on an attitude error threshold may then not be necessary. Specifically, when using such inertial sensors, the attitude-maintaining flight-control law presents a large amount of robustness in the face of attitude errors and angular velocity errors. Under such circumstances, the attitude-maintaining flight-control law leads to piloting errors that are negligible, given the accuracy of the inertial sensors.

Nevertheless, a degraded flight-control law may be an angular velocity-maintaining flight-control law that generates a given order to at least one actuator in order to achieve a target angular velocity of the aircraft while using only components of the angular velocity of the aircraft.

The verb "achieve" means that the angular velocity-maintaining flight-control law seeks to enable the aircraft to reach a target angular velocity.

Such a flight-control law may be advantageous when less-accurate inertial sensors are being used.

Under such circumstances, the method presents the following steps:

using the filter unit to calculate an estimated roll attitude angle and an estimated pitching attitude angle of the aircraft and at least one measurement accuracy margin, said at least one measurement accuracy margin comprising a roll angle accuracy margin and a pitching angle accuracy margin; and comparing the roll angle accuracy margin and the pitching angle accuracy margin with an "angle" threshold, said angular velocity-maintaining flight-control law being applicable only if at least one of said roll angle accuracy margin and said pitching angle accuracy margin is greater than or equal to the angle threshold.

This angle threshold may be equal to a value lying in the range 3° to 5°.

It is possible to envisage using inertial sensors belonging to inertial classes other than those mentioned above.

If gyros of a better inertial class are adopted, e.g. 0.01°/h, then an attitude-maintaining flight-control law or indeed the secondary ground speed flight-control law may be unnecessary.

In contrast, if gyros are selected of a poorer class, e.g. greater than 1°/h, then the level of assistance becomes degraded in a manner that is less continuous than in the above-described solution. Specifically, automatic switchover causes the autopilot system to change rapidly from a ground speed flight-control law to an attitude-maintaining flight-control law. The attitude-maintaining flight-control law is of limited robustness in the face of large errors concerning roll and pitching angles. Typically, the Applicant finds that the maximum error level that is accessible for piloting lies in the range 3° to 5° for roll or pitching errors. Beyond that, the pilot finds it difficult to act manually to compensate the movements of the aircraft resulting from such measurement errors.

As a result, if the inertial class of the inertial sensors used is likely to exceed this error level, then the invention proposes switching over to an angular velocity flight-control law that makes use only of angular velocity information.

In the absence of an angular velocity flight-control law, the method may present the following steps:

controlling an actuator in application of the default flight-control law so long as each measurement accuracy margin is less than the corresponding threshold;

controlling the actuator in application of the secondary ground speed flight-control law only if the at least one speed accuracy margin is greater than or equal to the speed threshold and no acceleration accuracy margin is greater than or equal to the acceleration threshold; and controlling the actuator in application of said attitude-maintaining flight-control law if the at least one acceleration accuracy margin is greater than or equal to the acceleration threshold.

In contrast, if an angular velocity flight-control law is present, then the method may present the following steps:

controlling an actuator in application of the default flight-control law so long as each measurement accuracy margin is less than the corresponding threshold;

controlling the actuator in application of the secondary ground speed flight-control law only if at least one speed accuracy margin is greater than or equal to the speed threshold and no acceleration accuracy margin is greater than or equal to the acceleration threshold and none of said roll angle and pitching angle accuracy values is greater than or equal to the angle threshold;

controlling the actuator in application of said attitude-maintaining flight-control law if at least one acceleration accuracy margin is greater than or equal to the acceleration threshold and none of said roll angle and pitching angle accuracy values is greater than or equal to the angle threshold; and controlling said actuator in application of the angular velocity-maintaining flight-control law if at least one of said roll angle and pitching angle accuracy margins is greater than or equal to the angle threshold.

In addition to a method, the invention provides a piloting assistance device configured to apply this method.

The invention thus provides a piloting assistance device for an aircraft, the aircraft having at least one actuator acting on a control member that is used in controlling the three-dimensional position of the aircraft, the piloting assistance device comprising an autopilot module storing at least two flight-control laws, each suitable for being applied to generate an order transmitted to at least one actuator, the piloting assistance device having a main measurement system and a secondary measurement system respectively determining at least one "predicted" value and at least one "measured" value for a parameter used in one of the flight-control laws referred to as the "default" flight-control law.

The piloting assistance device includes a filter unit connected to the autopilot module and to the main measurement system and to the secondary measurement system, with the filter unit applying a Kalman algorithm in order to perform the above-described method.

Finally, the invention provides an aircraft having at least one actuator acting on a control member for controlling the three-dimensional position of the aircraft.

The aircraft includes a piloting assistance device of the above-specified type.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 1 is a view of an aircraft of the invention;

FIGS. 2 and 3 are diagrams showing embodiments of a secondary measurement system;

FIGS. 4 to 6 are diagrams showing embodiments of a main measurement system;

Elements present in more than one of the figures are given the same references in each of them.

DETAILED DESCRIPTION OF THE INVENTION

FIG. 1 shows an aircraft 1 of the invention.

Figure 10:
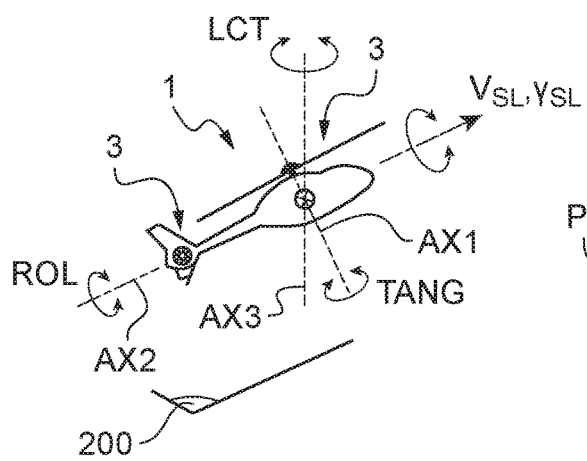
FIG. 10 is a diagram showing various angles of an aircraft.

With reference to FIG. 10, the aircraft may be a rotorcraft having rotors 3. In particular, the rotorcraft may have at least one rotor contributing at least in part to providing the aircraft with lift and possibly with propulsion, or indeed at least one rotor contributing to controlling yaw movement of the aircraft.

At each instant, the aircraft 1 presents a pitching angle TANG about a pitching axis AX1, a roll angle ROL about a roll axis AX2, and a yaw angle LCT about a yaw axis AX3.

Furthermore, the aircraft 1 moves relative to the ground 200 at a "ground" speed Vsl with an acceleration γsl. The ground speed and the acceleration present three components in the terrestrial reference frame, namely a lateral component, a longitudinal component, and an elevation component, referred to respectively as "EAST", "NORTH", "DOWN".

Figure 11:
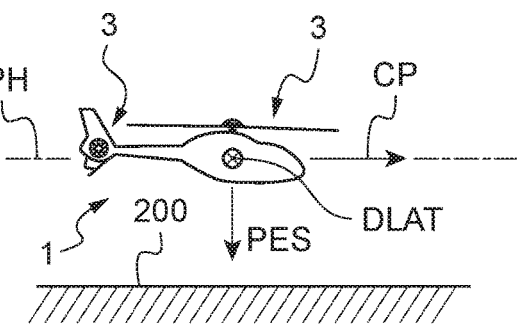
FIG. 11 is a diagram showing a lateral direction of an aircraft.

With reference to FIG. 11, the aircraft may present a "lateral" speed relative to the ground 200. The lateral speed represents a projection of the speed vector Vsl of the aircraft 1 in a lateral direction DLAT, this lateral direction being present in a horizontal plane PH perpendicular to gravity PES and being perpendicular to the heading CP being followed.

With reference to FIG. 1, the aircraft 1 has control members 2 for use in controlling the position of the aircraft in three dimensions. For example, such control members include the blades of a rotor 3 of a rotorcraft.

In order to move these control members 2, the aircraft has actuators 5. These actuators 5 may be in the form of electrical or pneumatic or hydraulic actuators, electric motors, . . . .

The actuators 5 may be controlled by a pilot using flight controls 6. For example, the flight controls of a helicopter may comprise a "cyclic pitch" control stick 7, a "collective pitch" lever, pedals, a keypad for inputting a target, . . . .

In architecture that is purely mechanical, each flight control is connected to an actuator 5 by a mechanical linkage 8. In architecture that is at least partially electrical, each flight control may generate an order for transmission over a wired or wireless link to an actuator.

Furthermore, the aircraft 1 includes a piloting assistance device 10.

The piloting assistance device 10 includes an autopilot module 20. By way of example, the autopilot module 20 may comprise a processor, an integrated circuit, a programmable system, a logic circuit, these examples not limiting the scope to be given to the term "autopilot module".

For example, the autopilot module 20 may comprise a computer 21 in the form of a processor or the equivalent with a memory unit 22. The memory unit 22 may possess a non-volatile memory storing non-modifiable information, and a volatile memory suitable for storing values of variables that vary over time.

In particular, flight-control laws L1, L2, L3, and L4 may be applied by the autopilot module 20. Under such circumstances, these flight-control laws may be stored in the non-volatile memory.

Each flight-control law enables the autopilot module to generate a given order to at least one actuator 5. For this purpose, in a purely mechanical architecture, the autopilot module may control an actuator 9 that is connected to a mechanical linkage 8. In an architecture that is at least partially electrical, the autopilot module 20 may generate an order that is transmitted by a wired or wireless link to an actuator 5.

These flight-control laws include a default flight-control law.

The default flight-control law may be a law referred to as the "main ground speed" flight-control law L1. Applying this main ground speed flight-control law L1 enables an order to be transmitted to at least one actuator 5 in order to maintain a target ground speed. This main ground speed flight-control law requires a particular lateral speed to be maintained in turning, referred to as the "lateral speed that is to be achieved".

By default, the lateral speed that is to be achieved may be zero, for example, but it may be modified by a pilot.

Furthermore, the autopilot laws include at least one degraded flight-control law.

One degraded flight-control law is referred to as the "secondary ground speed" flight-control law L2. The secondary ground speed flight-control law L2 serves to generate an order that is transmitted to at least one actuator 5 for maintaining a target ground speed. Nevertheless, the secondary ground speed flight-control law does not seek to maintain a lateral speed that is to be achieved while turning, unlike the main ground speed flight-control law L1.

By way of example, the cyclic pitch control stick may be moved by a pilot in order to issue a target ground speed, with the main ground speed flight-control law L1 or the secondary ground speed flight-control law L2 generating an order for tending to reach this target.

Another degraded flight-control law is referred to as the "attitude-maintaining" flight-control law L3. The attitude-maintaining flight-control law L3 generates an order that is transmitted to at least one actuator 5 in order to maintain a target attitude for the aircraft 1.

Under such circumstances, the attitude-maintaining flight-control law L3 enables a target roll angle ROL and/or a target pitching angle TANG to be maintained.

By way of example, the cyclic pitch control stick may be moved by a pilot in order to transmit a target roll angle ROL and/or a target pitching angle TANG, the attitude-maintaining flight-control law L3 generating an order tending to reach the target.

Another degraded flight-control law is referred to as the "angular velocity-maintaining" flight-control law L4. The angular velocity-maintaining flight-control law L4 generates an order that is transmitted to at least one actuator 5 so as to maintain a target angular velocity for the aircraft 1 using only components of an angular velocity of the aircraft 1. By way of example, the cyclic pitch control stick may be moved by a pilot to transmit a target angular velocity, with the angular velocity-maintaining flight-control law generating an order tending to reach that target.

By way of example, the angular velocity-maintaining flight-control law L4 seeks to maintain a zero angular velocity when the pilot does not issue any piloting order, and to generate a target angular velocity when the pilot moves a flight control.

Under such circumstances, when the piloting assistance device 10 is activated by the usual means (not shown), the autopilot module 20 determines which flight-control law is appropriate, and then controls each actuator using that appropriate flight-control law for each actuator.

The autopilot module 20 may be connected to warning means for informing a pilot about which flight-control law is being applied. Such warning means 70 may have a screen or the equivalent specifying the applied flight-control law in writing, a loudspeaker indicating the applied flight-control law by sound, or indeed a member informing a pilot by touch about the applied flight-control law. For example, a flight control may vibrate in different ways depending on the applied law.

In order to implement a flight-control law, the autopilot module 20 is connected to multiple members.

Thus, the autopilot module 20 may be connected to flight controls 6 enabling a pilot to set a target to be reached. The flight-control law then serves to establish orders for giving to the actuators as a function of the target to be reached and of the current state of the aircraft.

Furthermore, the autopilot module 20 may be connected to various sensors 60 for estimating the current state. These sensors 60 may include sensors 61 for establishing the current state of an actuator, such as a sensor measuring the position of a member of the actuator. These sensors 60 may also include means 62 that measure current parameter values of the aircraft such as its angular velocities, its attitudes, or its load factors.

Furthermore, in order to determine which flight-control law is appropriate, the autopilot module compares measurement accuracy margins for certain parameters with stored thresholds.

The piloting assistance device 10 possesses a processor subassembly for estimating the values of these parameters and the corresponding measurement accuracy margins.

The processor subassembly includes a main measurement system 30 and a secondary measurement system 40 acting respectively to determine at least one "predicted" value and at least one "measured" value for at least one parameter used in at least one of the flight-control laws.

The main measurement system 30 is said to be "main" insofar as the main measurement system 30 supplies the required measurements continuously, even though they might sometimes be contaminated with errors. Because of these errors, the measurements taken by the main measurement system 30 are said to be "predicted" values.

With reference to FIG. 4, the main measurement system may in particular comprise a plurality of inertial sensors including gyros 32 and accelerometers 31.

Thus, the main measurement system 30 may possess at least one inertial measurement unit 37 having a plurality of gyros and a plurality of accelerometers. In particular and by way of example, an inertial measurement unit 37 may have three gyros 32 arranged respectively on mutually orthogonal axes, and three accelerometers 31 arranged respectively on mutually orthogonal axes.

Each gyro 32 may possibly belong to a class of gyros having accuracy of at least 0.1°/h.

Such an inertial measurement unit may be part of an inertial guidance platform.

For example, the gyros 32 and the accelerometers 31 may be connected to a member commonly referred to as a "virtual platform" 33. The virtual platform 33 may comprise a processor, an integrated circuit, a programmable system, a logic circuit, these examples not being limiting on the scope to be given to the term "virtual platform". For example, the virtual platform may comprise a processor 34 executing instructions stored in a memory 35.

By integrating measurements from the gyros, the virtual platform determines the attitude of the aircraft at a calculation instant. Furthermore, by integrating the measurements from the accelerometers, which may be referenced relative to a terrestrial reference frame outside the aircraft when the attitude of the aircraft is known, the virtual platform determines the predicted values Vp of the three components of the ground speed of the aircraft in the terrestrial reference frame.

In the example of FIG. 4, only one inertial measurement unit is used.

In the example of FIG. 5, the piloting assistance device may have a plurality of inertial measurement units 371, 372. Each inertial measurement unit 371, 372 communicates with a calculation platform 360 serving in particular to perform filtering. For example, a first inertial measurement unit 371 and a second inertial measurement unit 372 transmit first and second predicted values Vp1 and Vp2 to the calculation platform for each of the components of the ground speed, together with first and second predicted values ωp1 and ωp2 for each angular velocity component, and first and second predicted values γp1 and γp2 for each acceleration component of the aircraft.

Independently of the embodiment, the primary measurement system serves to determine predicted values Vp for each component of the ground speed of the aircraft, predicted values γp for each component of the acceleration of the aircraft, and predicted values ωp for each component of the angular velocity of the aircraft. Likewise, the primary measurement system makes it possible to determine predicted values for a pitching angle TANGp and for a roll angle ROLp and for a heading angle of the aircraft.

Furthermore, and with reference to FIG. 2, the secondary measurement system 40 is said to be "secondary" insofar as this secondary measurement system 40 does not supply the required measurements permanently. Nevertheless, when the secondary measurement system 40 is in operation, the secondary measurement system 40 supplies accurate values that are then said to be "measured" values.

The secondary measurement system 40 may include object detection means that emit a detection signal that might be returned to the object detection means as a result of impacting against an object, such as a LIDAR or RADAR system.

Nevertheless, the secondary measurement system 40 could include satellite positioning means 45.

Consequently, the aircraft carries at least one satellite receiver means 41 suitable for communicating with a constellation of satellites 42.

In FIG. 2, a single satellite receiver 41 serves to determine the measured values of the components of the ground speed of the aircraft.

In FIG. 3, the aircraft has a plurality of satellite receiver means 41. Each satellite receiver means 41 communicates with its own constellation of satellites 42.

Thereafter, a consolidation unit 43 is connected to each satellite receiver means 41. Thus, each satellite receiver means 41 determines the measured values Vm1, Vm2 of the components of the ground speed of the aircraft. The consolidation unit 43 then deduces a consolidated measured value Vm for the components of the ground speed of the aircraft, e.g. by applying a median algorithm. Such a consolidation unit may be in the form of a computer or it may be incorporated in a computer.

It should be observed that the teaching of the document filed on Dec. 11, 2014 with the French patent office under the reference 14/02824 may be used for consolidating data.

With reference to FIG. 1, the predicted values Vp, γp, ωp, ROLp, and TANGp, and the measured values Vm are transmitted to a filter unit 50 of the processor subassembly.

This filter unit has at least one filter module 500 that applies a Kalman algorithm. By way of example, such a filter module 500 may comprise a processor, an integrated circuit, a programmable system, a logic circuit, these examples not limiting the scope to be given to the term "filter module".

For example, the filter module 500 may comprise a computer 51 in the form of a processor or the equivalent together with a memory unit 52. The memory unit 52 may possess a non-volatile memory 53 storing non-modifiable information and a volatile memory 54 suitable for storing the values of variables that vary over time.

In order to apply a Kalman algorithm, the usual equations for a Kalman filter are stored, such as for example the Riccati equation, which enables the covariance of estimation errors to be calculated.

Furthermore, an error model is stored. The error model includes a plurality of states that represent the defects of the gyros and of the accelerometers, together with their consequences on the horizontal and the vertical of the inertial platform. Typically, these states include the biases of the gyros relative to the axes carrying the gyros, the biases of the accelerometers relative to the axes carrying them, an attitude error for the inertial platform relative to true geographical axes, and an error for each component of the ground speed resulting from gyro errors via double integration and accelerometer errors by single integration.

The Kalman algorithm makes it possible to hybridize data coming from the main measurement system 30 and from the secondary measurement system 40.

Under such circumstances, the Kalman algorithm serves to determine estimated values for the ground speed components $\hat{V}$, for the acceleration component $\hat{\gamma}$, for the angular velocity component $\hat{\omega}$ for the roll angle $\widehat{ROL}$, and for the pitching angle $\widehat{TANG}$.

Furthermore, the Kalman algorithm makes it possible to determine measurement accuracy margins for each of these parameters.

Thus, the Kalman algorithm serves in particular to determine a speed accuracy margin $\sigma_{\varepsilon V}$ for each estimated component of the ground speed, an acceleration accuracy margin $\sigma_{\varepsilon \gamma}$ for each estimated component of the acceleration of the aircraft, a roll angle accuracy margin $\sigma_{\varepsilon ROL}$ for the estimated roll angle of the aircraft, and a pitching angle accuracy margin $\sigma_{\varepsilon TANG}$ for the estimated pitching angle of the aircraft.

The data fed to the filter module thus comes from the main measurement system 30 and from the secondary measurement system 40.

So long as the data from the secondary measurement system 40 is present, the states as estimated in real time are used for compensating the errors of the inertial sensors of the secondary measurement system 40. The estimating of the states is accompanied by estimating their covariances and their accuracy margins, by using the Riccati equation. The Riccati equation is provided with the data supplied by the gyros and the accelerometers and with information about the presence or absence of components of the ground speed as supplied by the secondary measurement system 40.

Each accuracy margin may be equal to the square root of a term present on the diagonal of the covariance matrix.

Even when values for components of the ground speed as supplied by the secondary measurement system 40 are not available, the accuracy margins and the estimated values continue to be estimated in an open loop, i.e. in the absence of measured ground speed values. Nevertheless, the accuracy margins will then increase, and they will increase faster when the flightpath of the carrier is dynamic. This dependency of the accuracy margins on the flightpath is taken into account in the Riccati equation via data supplied by the gyros and the accelerometers.

These accuracy margins are then used in the method of the invention for determining which flight-control law to apply at each instant.

Thereafter, the data estimated by the filter module is transmitted to the autopilot module 20.

Figure 6:
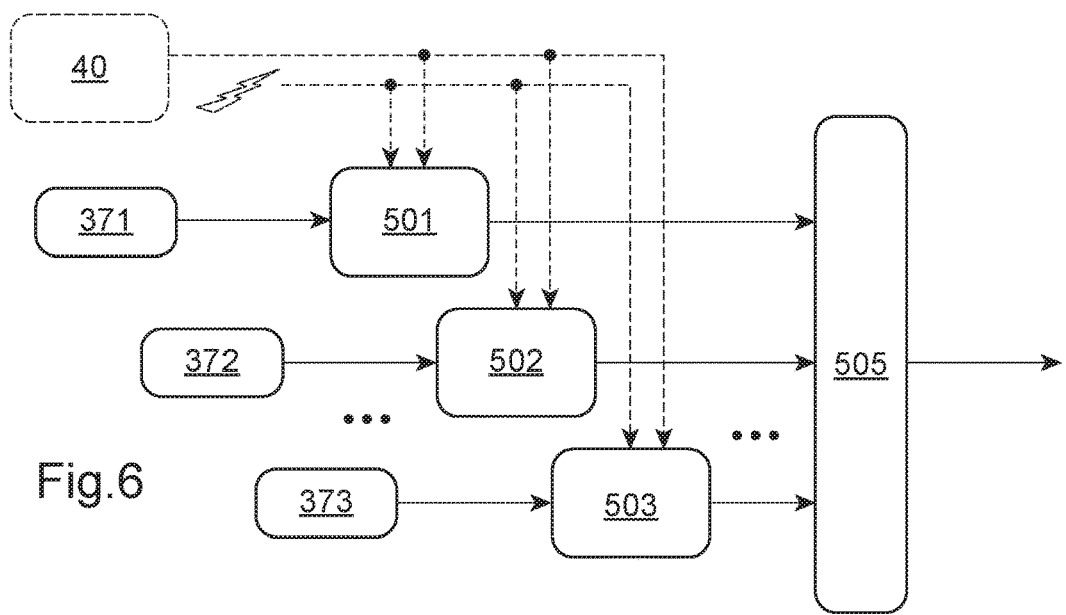

With reference to FIG. 6, the filter unit may have a plurality of filter modules 501, 502, 503. For example, the filter unit may have one filter module per inertial measurement unit 371, 372, 373.

The data estimated by each filter module is then transmitted to consolidation means 505, e.g. consolidation means of the type described above.

For example, the consolidation means 505 apply a median algorithm in order to monitor accuracy margins for each variable of interest (e.g. speed of acceleration) as calculated using data from a plurality of inertial measurement units 371, 372, 373, prior to informing the autopilot module of consolidated accuracy margins, that are thus declared to be not corrupt. If an accuracy margin departs from a predefined threshold relative to the median value between all of the values of all of the filter modules 501, 502, 503, then, providing there is sufficient redundancy, the system reconfigures itself automatically in order to put aside automatically the defective value. If the redundancy of the inertial measurement unit 371, 372, 373 is not sufficient, then the most degraded flight-control law is automatically selected by the device (i.e. the law that does not require any parameter for which the accuracy margin has been declared as corrupt).

Figure 7:
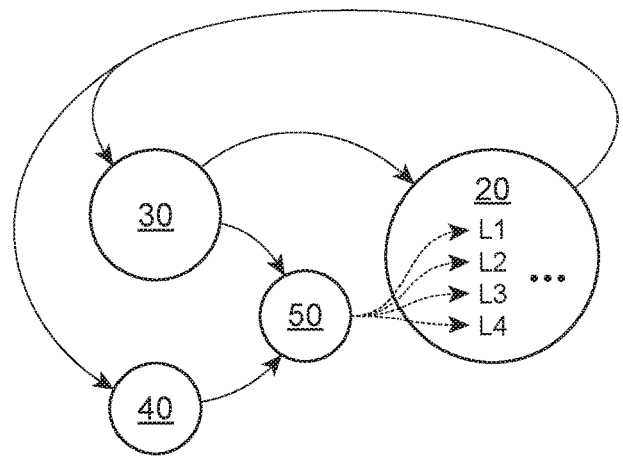
FIGS. 7 to 9 are diagrams explaining the method of the invention.
Figure 8:
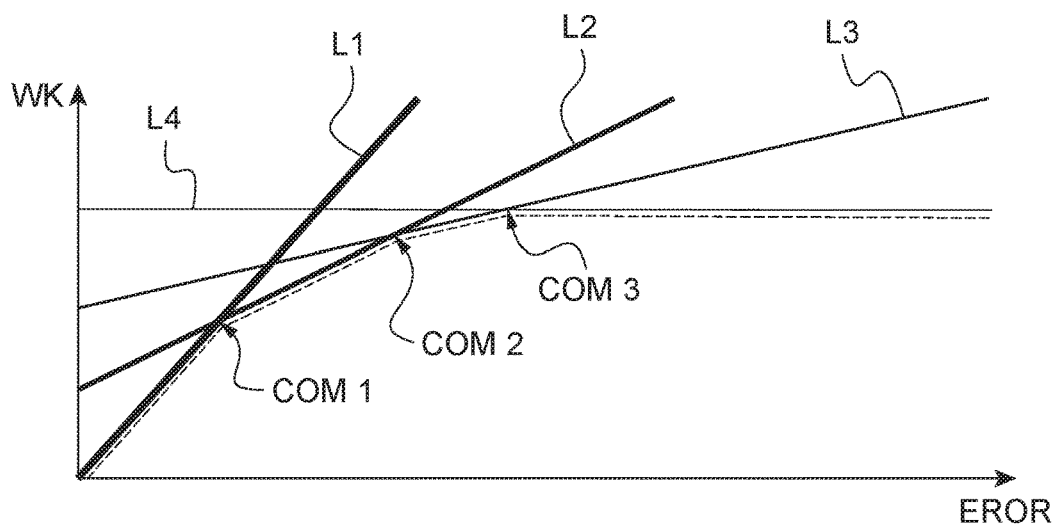
Figure 9:
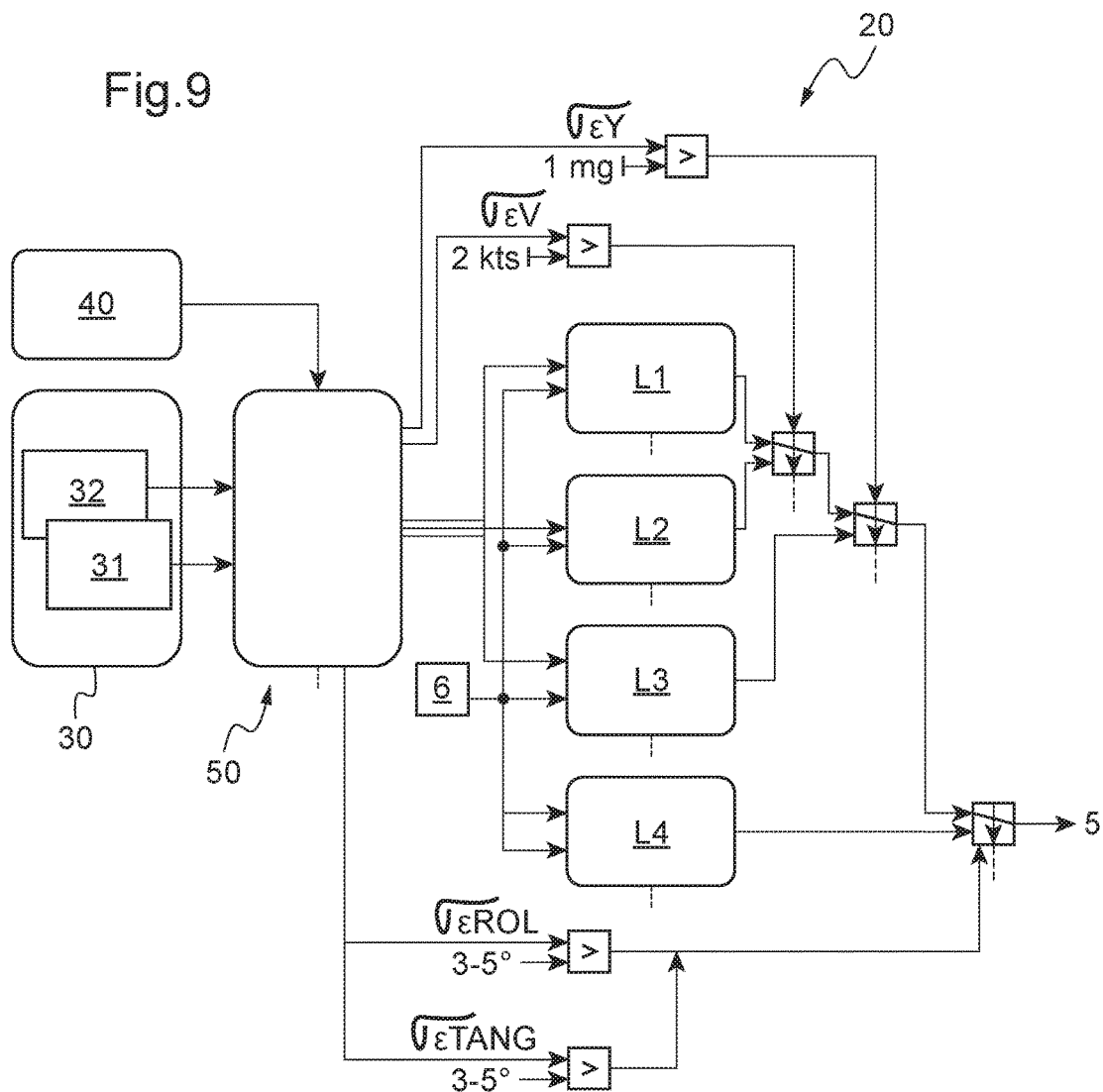

FIGS. 7 to 9 show the method of the invention.

With reference to FIG. 7, the invention associates a main measurement system 30 supplying data with a secondary measurement system 40 serving continuously to identify defects of the main measurement system 30 via a filter unit 50.

The errors of the main measurement system 30 lead to measurement accuracy margins that are estimated by the filter unit 50.

The autopilot module 20 then determines which flight-control law to apply as a function of the accuracy margin. When consolidation means 505 are used downstream from the filter unit, the consolidation means 505 can determine whether the accuracy margins of a variable as determined by each filter module are substantially equal.

Specifically, these various accuracy margins for a given variable are supposed to be identical in the absence of a sensor breakdown, since the accuracy margins depend only on the flightpath and on the inertial class of the sensors. The consolidation means 505 thus make it possible automatically to discredit erroneous accuracy margins providing there is sufficient sensor redundancy. Otherwise, automatic reversion to the most degraded flight-control law is invoked if the location of the error cannot be determined.

FIG. 8 shows the advantage of the invention.

FIG. 8 is a graph plotting the workload WK of a pilot up the ordinate axis and errors EROR of the main measurement system 30 along the abscissa axis.

Furthermore, the main ground speed, the secondary ground speed, the attitude-maintaining, and the angular velocity-maintaining flight-control laws L1, L2, L3, and L4 are shown diagrammatically.

It can be understood that switchovers COM1, COM2, COM3 between two flight-control laws at appropriate moments serve to optimize the workload of a pilot.

By way of example, initially the main ground speed flight-control law L1 is applied. As from a given instant, the autopilot module automatically performs a first switchover COM1 to apply the secondary ground speed flight-control law L2. The errors in the main measurement system 30 then continue to increase, thereby leading to a second switchover COM2 to the attitude-maintaining flight-control law L3. Possibly, a third switchover COM3 may subsequently lead to the angular velocity-maintaining flight-control law L4 being put into operation automatically.

FIG. 9 shows in greater detail the method applied by the piloting assistance device 10.

With reference to FIG. 9, the main measurement system determines the predicted parameter values, and in particular each component of the ground speed of the aircraft, each component of the acceleration of the aircraft, each component of the angular velocity of the aircraft, a pitching angle TANGp, and also a roll angle ROLp of the aircraft.

The secondary measurement system 30 determines "measured" values for the components of the ground speed.

Under such circumstances, from each predicted value and each measured value, the filter unit determines an estimated value for at least one parameter measured by the primary measurement system, and estimates at least one measurement accuracy margin.

In particular, the filter unit determines estimated values for the components of the ground speed $\hat{V}$, for the components of the acceleration $\hat{\gamma}$, for the components of the angular velocity $\hat{\omega}$, for the roll angle ROL, and for the pitching angle TANG from the received predicted and measured values.

Furthermore, the filter unit determines a speed accuracy margin $\sigma_{\varepsilon V}$ for each estimated component of the ground speed, an acceleration accuracy margin $\sigma_{\varepsilon \gamma}$ for each estimated component of the acceleration of the aircraft, a roll angle accuracy margin $\sigma_{\varepsilon ROL}$ for the estimated roll angle of the aircraft, and a pitching angle accuracy margin $\sigma_{\epsilon TANG}$ for the estimated pitching angle of the aircraft.

The various estimated values and estimated measurement accuracy margins are transmitted to the autopilot module.

Under such circumstances, the autopilot module compares the measurement accuracy margins with corresponding thresholds.

Thereafter, the autopilot module controls at least one actuator 5 while automatically applying the default flight-control law L1 so long as each of the measurement accuracy margins is less than the corresponding threshold.

In contrast, the autopilot module controls at least one actuator 5, while automatically applying a degraded flight-control law L2, L3, L4 when at least one measurement accuracy margin is greater than or equal to the corresponding threshold.

In particular, the filter unit confers a speed accuracy margin $\sigma_{\epsilon V}$ for each component of the estimated ground speed of the aircraft with a "speed" threshold. Such a speed threshold may be equal to 2 kt.

Thereafter, the secondary ground speed flight-control law L2 can be applied only if at least one speed accuracy margin is greater than or equal to the speed threshold.

Furthermore, the filter unit compares each acceleration accuracy margin $\sigma_{\epsilon \gamma}$ with an acceleration threshold, e.g. equal to one thousandth of terrestrial gravity.

Thereafter, the attitude-maintaining flight-control law can be applied only if at least one acceleration accuracy margin is greater than or equal to the acceleration threshold.

Furthermore, the filter unit can compare a roll angle accuracy margin $\sigma_{\epsilon ROL}$ and a pitching angle accuracy margin $\sigma_{\epsilon TANG}$ with an angle threshold, e.g. lying in the range 3° to 5°.

Thereafter, the autopilot module controls at least one actuator in application of the default flight-control law so long as each measurement accuracy margin is less than the corresponding threshold.

In contrast, the autopilot module controls the actuator in application of the secondary ground speed flight-control law if at least one speed accuracy margin is greater than or equal to the speed threshold, and if no acceleration accuracy margin is greater than or equal to the acceleration threshold, or indeed if none of said roll angle and pitching angle accuracy values is greater than or equal to the angle threshold.

Furthermore, the autopilot module controls the actuator in application of said attitude-maintaining flight-control law if at least one acceleration accuracy margin is greater than or equal to the acceleration threshold, or indeed if none of said roll angle and pitching angle accuracy values is greater than or equal to the angle threshold.

Finally, the autopilot module controls an actuator in application of the angular velocity-maintaining flight-control law if at least one of said roll angle and pitching angle accuracy margins is greater than or equal to the angle threshold.

The method thus makes it possible to smooth degradation in piloting assistance by switching successively between various flight-control laws when the estimated error of the primary measurement system crosses certain thresholds. A variant of the invention consists in smoothing the switchovers themselves by progressively limiting the authority of terms providing a high level of assistance, until they become zero in order to finalize switchover. An example is progressively limiting the assistance in turn coordination (which itself depends on ground speed) as a function of the esti-mated ground speed error, until actually switching over to a secondary ground speed flight-control law.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, the aircraft may have a plurality of actuators. Under such circumstances, two different actuators may be associated with different sets of distinct flight-control laws, each set of flight-control law having a default flight-control law and degraded flight-control laws.

What is claimed is:

1. A piloting assistance method for an aircraft having at least one actuator acting on a control member that is used in controlling the three-dimensional position of the aircraft, the aircraft storing at least two flight-control laws, where each of the flight-control law can be applied to generate an order that is transmitted to at least one actuator, the aircraft having a main measurement system and a secondary measurement system respectively determining at least one predicted value and at least one measured value for a parameter used in one of the flight-control laws referred to as a default flight-control law (L1), the predicted value being speed components obtained from and inertial unit, wherein each flight-control law other than the default flight-control law is a degraded flight-control law (L2, L3, L4), the method comprising:

applying a Kalman algorithm with a filter unit to calculate an estimated value from at least one predicted value and to estimate at least one measurement accuracy margin of a parameter associated with a predicted value;

comparing the measurement accuracy margin with a corresponding threshold;

controlling the actuator while automatically applying the default flight-control law (L1) so long as each measurement accuracy margin is less than the corresponding threshold; and controlling the actuator while automatically applying a degraded flight-control law (L2, L3, L4) when at least one measurement accuracy margin is greater than or equal to the corresponding threshold.

2. A method according to claim 1, wherein the method includes a warning step during which a warning is generated when a degraded flight-control law (L2, L3, L4) is applied.

3. A method according to claim 1, wherein the default flight-control law is a main ground speed flight-control law (L1) that generates a given order to at least one actuator in order to maintain a target ground speed.

4. A method according to claim 3, wherein the main ground speed flight-control law acts during each turn to impose a lateral speed that is to be achieved by the aircraft relative to ground in a lateral direction (DLAT) present in a horizontal plane (PH) perpendicular to gravity (PES), the lateral direction (DLAT) being perpendicular to a heading (CP) being followed.

5. A method according to claim 1, wherein a degraded flight-control law is a secondary ground speed flight-control law (L2) that generates a given order to at least one actuator to maintain a target ground speed, the secondary ground speed flight-control law, during each turn, not controlling a lateral speed to be achieved by the aircraft relative to ground in a lateral direction (DLAT) present in a horizontal plane perpendicular to gravity, the lateral direction being perpendicular to a heading being followed.

6. A method according to claim 5, wherein the method comprises:
using the filter unit to calculate components of an estimated ground speed of the aircraft and at least one measurement accuracy margin, the at least one measurement accuracy margin comprising a speed accuracy margin for each component of an estimated ground speed of the aircraft; and
comparing each speed accuracy margin with a speed threshold, the secondary ground speed flight-control law being applicable only if at least one speed accuracy margin is greater than or equal to a speed threshold.

7. A method according to claim 6, wherein the speed threshold is equal to 2 kt.

8. A method according to claim 1, wherein a degraded flight-control law is an attitude-maintaining flight-control law (L3) that generates a given order to at least one actuator in order to maintain a target attitude for the aircraft.

9. A method according to claim 8, wherein the method presents the following steps:
using the filter unit to calculate components of an estimated acceleration of the aircraft and at least one measurement accuracy margin, the at least one measurement accuracy margin comprising an acceleration accuracy margin for each component of the estimated acceleration of the aircraft; and
comparing each acceleration accuracy margin with an acceleration threshold, the attitude-maintaining flight-control law being applicable only if at least one acceleration accuracy margin is greater than or equal to an acceleration threshold.

10. A method according to claim 9, wherein an acceleration threshold is equal to one thousandth of terrestrial gravity.

11. A method according to claim 1, wherein a degraded flight-control law is an angular velocity-maintaining flight-control law (L4) that generates a given order to at least one actuator in order to achieve a target angular velocity of the aircraft while using only components of the angular velocity of the aircraft.

12. A method according to claim 11, wherein the method presents the following steps:
using the filter unit to calculate an estimated roll attitude angle and an estimated pitching attitude angle of the aircraft and at least one measurement accuracy margin, the at least one measurement accuracy margin comprising a roll angle accuracy margin and a pitching angle accuracy margin; and
comparing the roll angle accuracy margin and the pitching angle accuracy margin with an angle threshold, the angular velocity-maintaining flight-control law being applicable only if at least one of the roll angle accuracy margin and the pitching angle accuracy margin is greater than or equal to an angle threshold.

13. A method according to claim 12, wherein an angle threshold is equal to a value from 3° to 5°.

14. A method according to claim 1, wherein one degraded flight-control law is a secondary ground speed flight-control law (L2) that generates a given order to at least one actuator to maintain a target ground speed, the secondary ground speed flight-control law, during each turn, not controlling a lateral speed to be achieved by the aircraft relative to ground in a lateral direction (DLAT) present in a horizontal plane perpendicular to gravity, the lateral direction being perpendicular to a heading being followed; and another degraded flight-control law is an attitude-maintaining flight-control law (L3) that generates a given order to at least one actuator in order to maintain a target attitude for the aircraft;
and wherein the method presents the steps of:
controlling the actuator in application of the default flight-control law so long as each measurement accuracy margin is less than the corresponding threshold;
controlling the actuator in application of the secondary ground speed flight-control law only if at least one speed accuracy margin is greater than or equal to a speed threshold and no acceleration accuracy margin is greater than or equal to an acceleration threshold; and
controlling the actuator in application of the attitude-maintaining flight-control law if at least one acceleration accuracy margin is greater than or equal to the acceleration threshold.

15. A method according to claim 1, wherein one degraded flight-control law is a secondary ground speed flight-control law (L2) that generates a given order to at least one actuator to maintain a target ground speed, the secondary ground speed flight-control law, during each turn, not controlling a lateral speed to be achieved by the aircraft relative to ground in a lateral direction (DLAT) present in a horizontal plane perpendicular to gravity, the lateral direction being perpendicular to a heading being followed; another degraded flight-control law is an attitude-maintaining flight-control law (L3) that generates a given order to at least one actuator in order to maintain a target attitude for the aircraft; and another degraded flight-control law is an angular velocity-maintaining flight-control law (L4) that generates a given order to at least open actuator in order to achieve a target angular velocity of the aircraft while using only components of the angular velocity of the aircraft;
and wherein the method presents the following steps:
controlling an actuator in application of the default flight-control law so long as each measurement accuracy margin is less than the corresponding threshold;
controlling the actuator in application of the secondary ground speed flight-control law only if at least one speed accuracy margin is greater than or equal to a speed threshold and no acceleration accuracy margin is greater than or equal to an acceleration threshold and none of a roll angle and pitching angle accuracy values is greater than or equal to an angle threshold;
controlling the actuator in application of the attitude-maintaining flight-control law if at least one acceleration accuracy margin is greater than or equal to the acceleration threshold and none of the roll angle and pitching angle accuracy values is greater than or equal to the angle threshold; and
controlling the actuator in application of the angular velocity-maintaining flight-control law if at least one of the roll angle and pitching angle accuracy margins is greater than or equal to the angle threshold.

16. A method according to claim 1, wherein the main measurement system includes a plurality of gyros and a plurality of accelerometers.

17. A method according to claim 16, wherein each gyro belongs to a gyro class having accuracy of 0.1°/h, or better.

18. A method according to claim 1, wherein the secondary measurement system includes satellite positioning means.

19. A method according to claim 1, wherein the secondary measurement system includes object detector means that emit a detection signal capable of returning to the object detector means following an impact against an object.

20. A method according to claim 1, wherein the filter unit applies a Kalman algorithm establishing a covariance matrix, and each measurement accuracy margin is equal to the square root of a term present on a diagonal of the covariance matrix.

21. A method for controlling a piloting assistance device for an aircraft, the aircraft having at least one actuator acting on a control member that is used in controlling the three-dimensional position of the aircraft, the piloting assistance device comprising an autopilot module storing at least two flight-control laws, each control law being suitable for being applied to generate an order transmitted to at least one actuator, the piloting assistance device having a main measurement system and a secondary measurement system respectively determining at least one predicted value and at least one measured value for a parameter used in one of the flight-control laws referred to as a default flight-control law, the piloting assistance device including a filter unit connected to the autopilot module and to the main measurement system and to the secondary measurement system, wherein the filter unit applies a Kalman algorithm in order to perform the method comprising:

applying a Kalman filter algorithm to calculate an estimated value from at least one predicted value and to estimate at least one measurement accuracy margin of a parameter associated with a predicted value;

comparing the measurement accuracy margin with a corresponding threshold;

controlling the actuator while automatically applying the default flight-control law(L1) so long as each measurement accuracy margin is less than the corresponding threshold; and controlling the actuator while automatically applying a degraded flight-control law (L2, L3, L4) when at least one measurement accuracy margin is greater than or equal to the corresponding threshold.

22. An aircraft having at least one actuator acting on a control member used in controlling the three-dimensional position of the aircraft, wherein the aircraft includes a piloting assistance comprising:

an autopilot module storing at least two flight-control laws, each control law being suitable for being applied to generate an order transmitted to at least one actuator, the piloting assistance device having a main measurement system and a secondary measurement system respectively determining at least one predicted value and at least one measured value for a parameter used in one of the flight-control laws referred to as a default flight-control law, the piloting assistance device including a filter unit connected to the autopilot module and to the main measurement system and to the secondary measurement system, wherein the filter unit applies a Kalman algorithm in order to perform a method comprising:

applying a Kalman filter algorithm to calculate an estimated value from at least one predicted value and to estimate at least one measurement accuracy margin of a parameter associated with a predicted value;

comparing the measurement accuracy margin with a corresponding threshold;

controlling the actuator while automatically applying the default flight-control law (L1) so long as each measurement accuracy margin is less than the corresponding threshold; and controlling the actuator while automatically applying a degraded flight-control law (L2, L3, L4) when at least one measurement accuracy margin is greater than or equal to the corresponding threshold.

* * * * *